United States Patent [19]

Nissimoff et al.

[11] Patent Number: 5,188,561
[45] Date of Patent: Feb. 23, 1993

[54] AIR CONDITIONING GRILL

[76] Inventors: Nissim Nissimoff, 5 Bat Yiftach Street, Zahala; Jacob Nissimoff, 19 Hapodim Street, Ramat Gan, both of Israel

[21] Appl. No.: 739,197

[22] Filed: Aug. 1, 1991

[51] Int. Cl.⁵ .............................. F24F 13/10
[52] U.S. Cl. .................. 454/256; 454/315; 454/316; 454/317; 454/324
[58] Field of Search .............. 454/256, 258, 385, 313, 454/315, 316, 317, 321, 322, 324; 236/1 B, 49.3

[56] References Cited

U.S. PATENT DOCUMENTS

| | | | |
|---|---|---|---|
| 705,609 | 7/1902 | Pugh | 454/324 |
| 2,281,615 | 5/1942 | Peple, Jr. | 454/256 |
| 2,759,411 | 8/1956 | Jenson | 454/316 |
| 3,537,380 | 11/1970 | Spradling et al. | 454/256 |
| 4,339,991 | 7/1982 | Asano et al. | 454/317 |
| 4,407,447 | 10/1983 | Sayegh | 236/49.3 |
| 5,014,610 | 5/1991 | Twito | 454/313 |

Primary Examiner—Harold Joyce
Attorney, Agent, or Firm—Ladas & Parry

[57] ABSTRACT

An air conditioning outlet and inlet grill for installation in static structures comprising a plurality of modular grill units and apparatus for interconnecting the plurality of modular grill units in a desired grid arrangement.

8 Claims, 5 Drawing Sheets

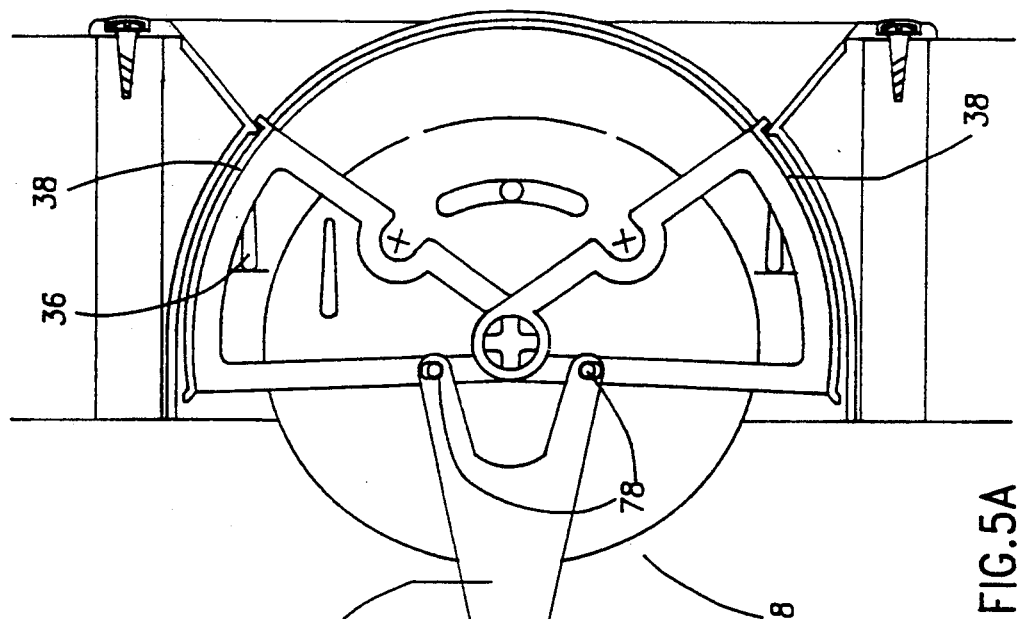
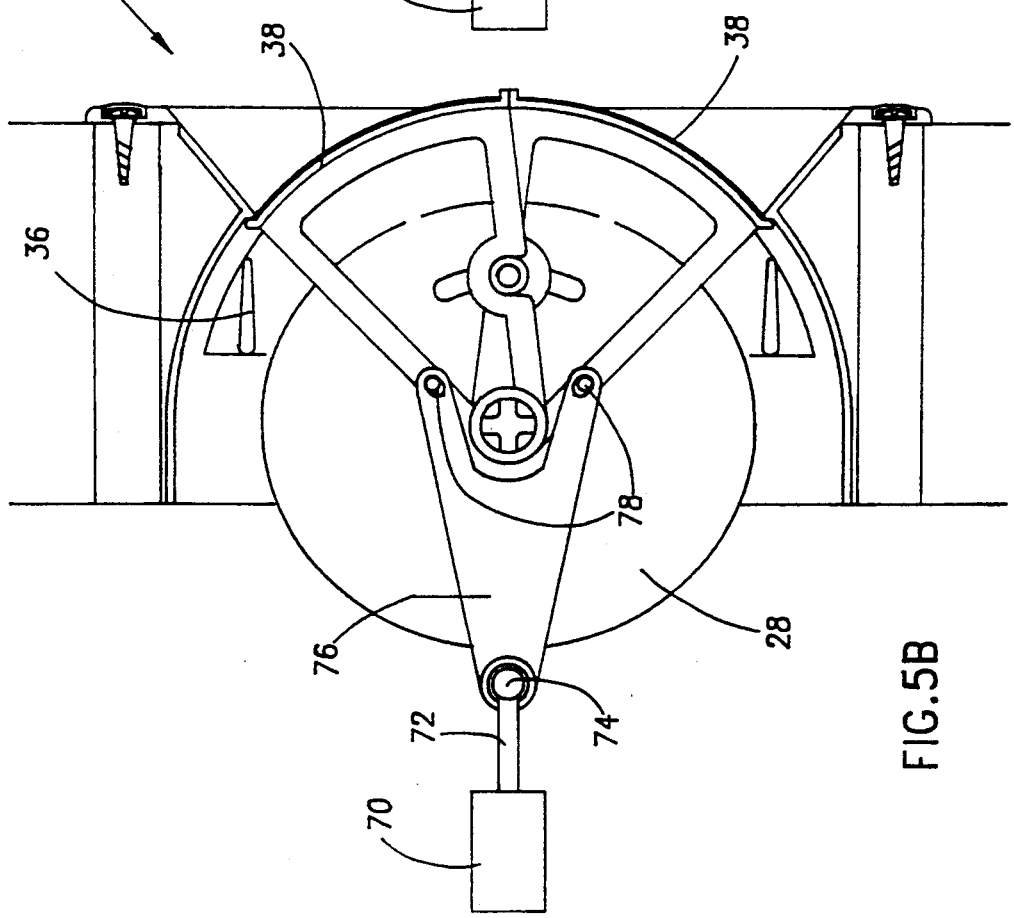
FIG.5A
FIG.5B

AIR CONDITIONING GRILL

FIELD OF THE INVENTION

The present invention relates generally to air conditioning appratus and more particularly to air conditioning grill.

BACKGROUND OF THE INVENTION

There are known a great variety of air conditioning grills. One common problem with conventional air conditioning grills is that a change in intended direction of the outlet air stream also involves a change in the outlet air volume and increases resistance to air flow. Similarly, modular units tend to inhibit air flow between the modules.

SUMMARY OF THE INVENTION

The present invention seeks to provide an improved air conditioning grill.

There is thus provided in accordance with a preferred embodiment of the present invention an air conditioning outlet and inlet grill for installation in static structures comprising a plurality of modular grill units and apparatus for interconnecting the plurality of modular grill units in a desired grid arrangement.

Preferably the modular grill units comprise first and second arrays of vanes extending generally perpendicularly to each other each being array being directable independently of the other.

In accordance with a preferred embodiment of the present invention there is provided in the grill units apparatus for selectably directing an outlet air flow, in a 360° direction, without changing the volume of the air flow.

In accordance with one embodiment of the invention there is provided motor driven apparatus for automatically varying the direction of air flow.

Additionally in accordance with a preferred embodiment of the invention there is provided apparatus for automatically preventing outlet air flow from the grill under predetermined conditions.

Remote control apparatus may be provided for controlling the apparatus for automatically preventing. The remote control apparatus may include apparatus for sensing the absence of a person in a given area, for automatically preventing outlet air flow from the grill.

Alternatively or additionally, the remote control apparatus may comprise a thermostatic control.

Preferably, the operation of the apparatus for preventing does not alter the volume or direction of outlet air flow from the grill when air flow is not prevented.

Additionally in accordance with a preferred embodiment of the present invention, apparatus is provided for coupling air directing vanes in each of the modular units together for common driving thereof.

Despite the modular grill units, the unique structure ensures maximum air flow between modules which is essential for maintaining air directivity.

BRIEF DESCRIPTION OF THE DRAWINGS

The present invention will be understood and appreciated more fully from the following detailed description, taken in conjunction with the drawings in which:

FIGS. 5A and 5B are illustrations of a mechanism for automatically opening and closing the outlet of a grill module.

DETAILED DESCRIPTION OF A PREFERRED EMBODIMENT

Figure 1A:
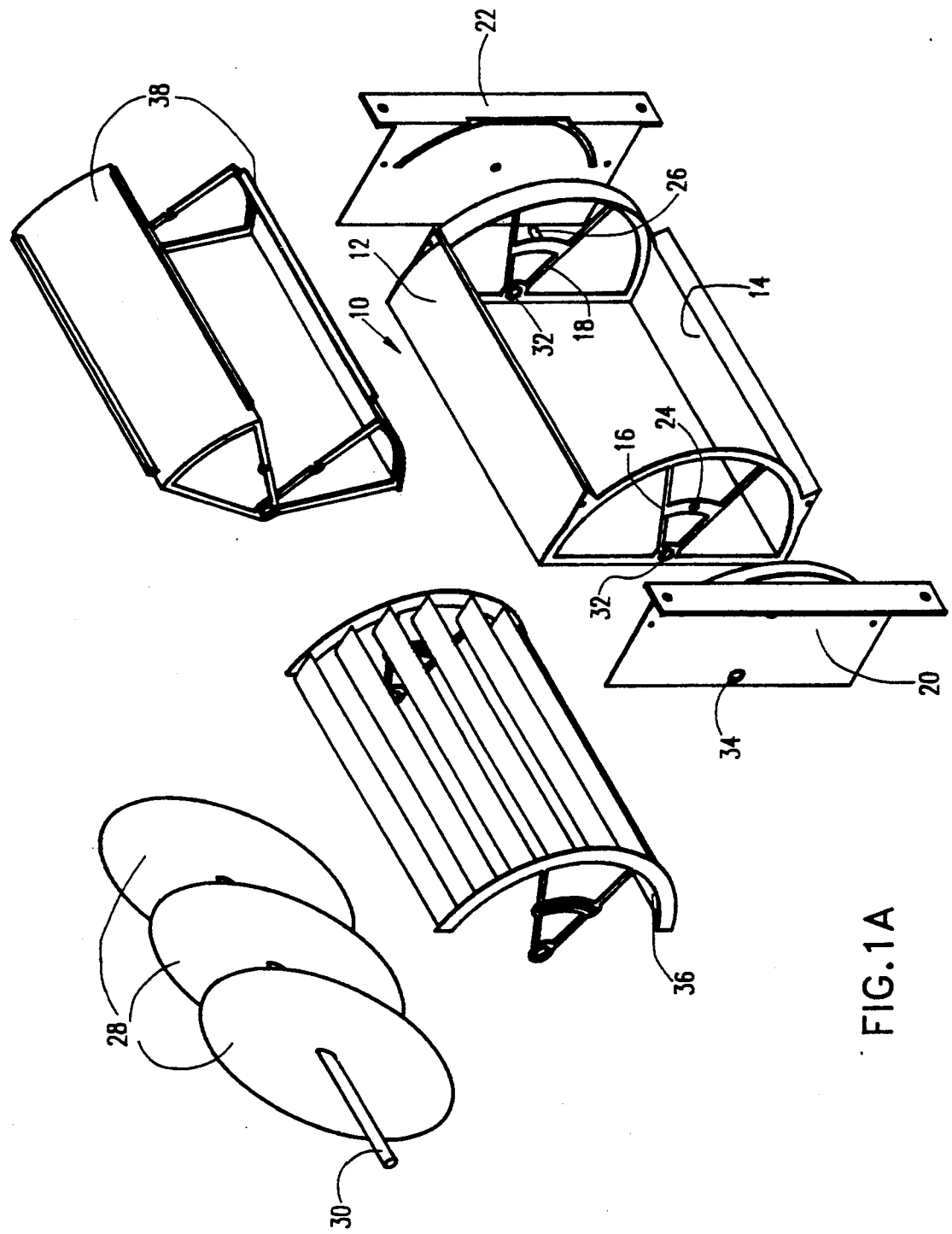
FIG. 1A and 1B are respective exploded view and pictorial illustrations of an air conditioning grill module constructed and operative in accordance with a preferred embodiment of the present invention.
Figure 1B:
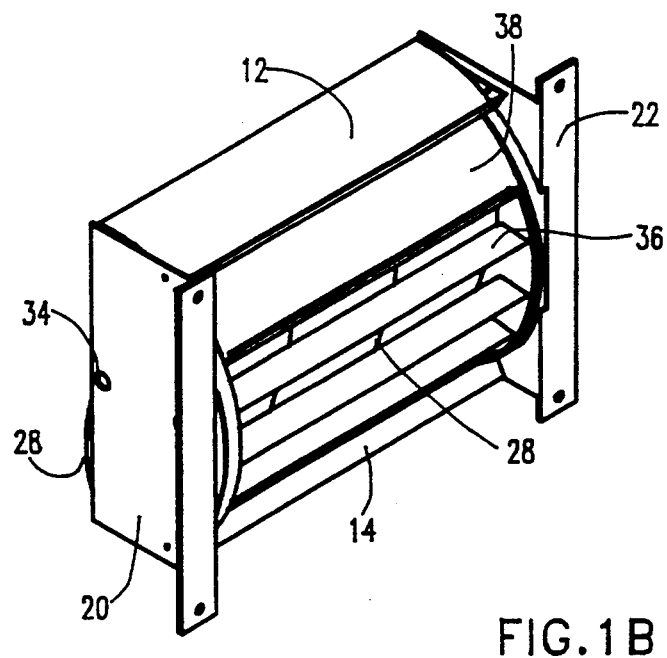

Reference is now made to FIGS. 1A and 1B, which illustrate an air conditioning grill module constructed and operative in accordance with a preferred embodiment of the present invention. The grid module preferably comprises a housing portion 10, which is preferably injection molded of plastic and defines top and bottom wall portions 12 and 14 respectively, an open back for receipt of air to be circulated from a common air supply volume and side portions 16 and 18 which are operative for mounting of various other components of the grid modules thereon.

Module side mounting panels 20 and 22 are mounted onto respective pins 24 and 26 of respective side portions 16 and 18. When a plurality of modules are joined together side to side, the mounting panels between adjacent modules may be eliminated. A plurality of sideways air directing vanes 28 are mounted in skewed arrangement onto an axle 30, which is in turn rotatably mounted on axle support apertures 32 formed in side portions 16 and 18 and may pass through a corresponding aperture 34 formed in each of module side mounting panels 20 and 22.

An up-down air directing vane assembly 36 may be arranged for selective rotation about axle 30 and is operative to change the up-down direction of the air without changing the total air output volume. The position of vane assembly 36 is normally manually set although it may be mechanically governed by the provision of a drive element and a suitable linkage.

A pair of outlet-closing cover elements 38 may also be provided for rotation about axis 30. Selectable opening and partial or complete closing of the air outlet from the module is provided by selectable positioning of the cover elements 38. The positions of cover elements 38 are normally manually set although they may be mechanically governed by the provision of a drive element and a suitable linkage, as illustrated in FIGS. 5A and 5B. Referring now to FIGS. 5A and 5B, there is shown apparatus for automatic positioning of cover elements 38. The apparatus comprises a solenoid 70, which may be any suitable conventional solenoid operative in response to electrical voltage inputs, having a retractable shaft 72. Shaft 72 is, in turn, mounted, as by a pin 74, onto a driving member 76.

Driving member 76 is typically a forked member, onto the extreme ends of whose forks are rotatably mounted pins 78 which are fixed to side members of cover elements 38, as shown in FIGS. 5A and 5B, which illustrate respective open and closed orientations.

When solenoid 70 is operated to extend shaft 72, the driving member 76 moves forwardly and causes rotation of the cover members 38 about a mutual central axis at axle support apertures 32 towards each other to assume a closed orientation, preventing exit of air therepast, as illustrated in FIG. 5B.

When the solenoid 70 is operated to retract shaft 72, the driving member 76 moves rearwardly and causes rotation of the cover members 38 away from each other to an open orientation, as seen in FIG. 5A.

In accordance with a preferred embodiment of the invention there is provided an automatically operative central air conditioning system which automatically opens and closes the cover elements 38 of an air outlet grid module in accordance with predetermined criteria. One example of such a system is illustrated schematically in FIG. 2. One or more sensors, such as a temperature sensor 50 and a presence sensor 52, which senses the presence of an occupant in a room, such as a hotel room, and may comprise, for example, a passive infrared sensor such as those commercially available from Visonic, of Bnei Brak, Israel, may provide electrical outputs to an AND gate. The AND gate provides an electrical output, when at least a certain temperature threshold is reached and when a room is occupied. This output may be supplied to a grill controller 56 which can provide suitable control inputs to apparatus for automatically opening cover elements 38 to provide output air of a desired temperature to the room. Such apparatus is illustrated in FIGS. 5A and 5B and described hereinabove.

It will be appreciated that the system of the present invention may be used for heating as well as for cooling and may provide either open-closed operation or additionally a variable type of control of the volume of air that is permitted to pass through the output grill per unit time.

Figure 3:
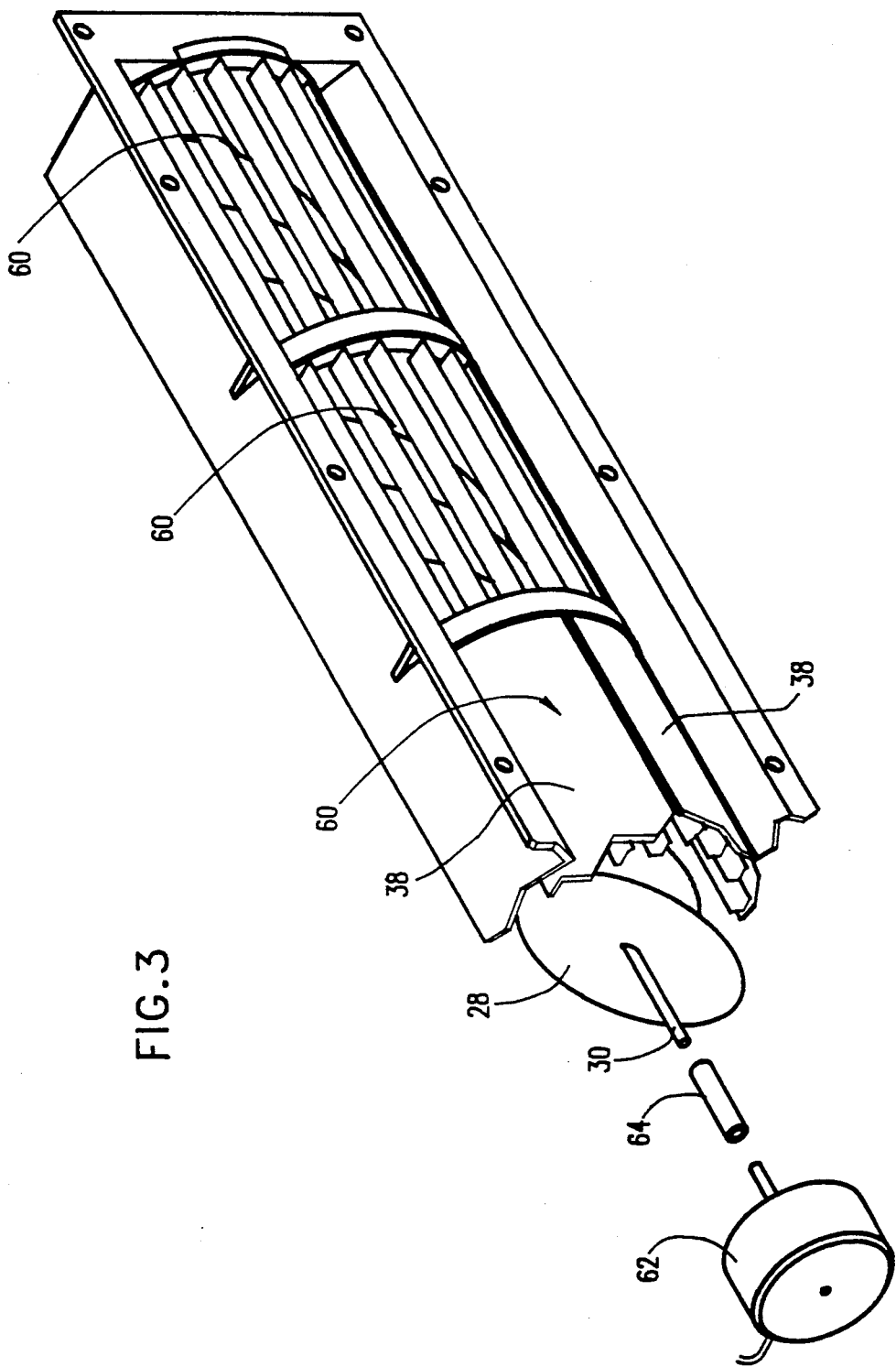
FIG. 3 is a partially exploded, partially pictorial illustration of a motorized grill comprising a plurality of inter-connected grid modules.

Reference is now made to FIG. 3, which illustrates a bank of grill modules 60, which are joined together in side by side arrangement. Here the rotation of axle 30, to provide time varying side-to-side direction of the air output of the bank of grill modules is produced by a motor 62, such as a synchronous geared motor, which may be coupled to axle 30 as by a flexible coupling 64.

Figure 2:
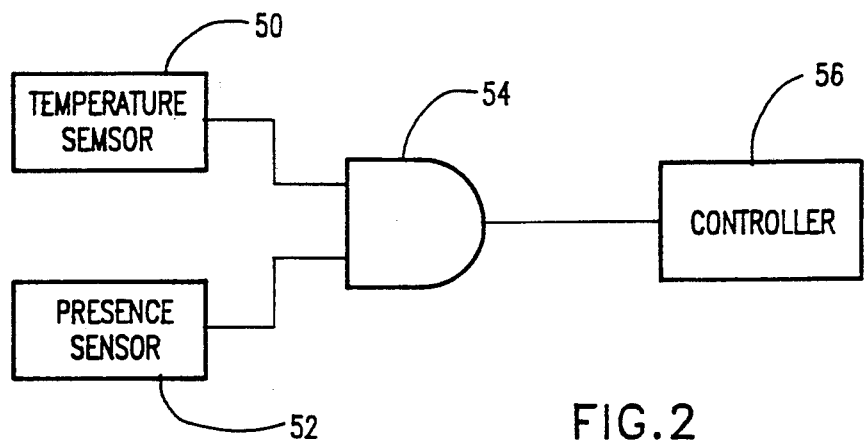
FIG. 2 is a block diagram illustration of an automatically controlled air-conditioning grill system constructed and operative in accordance with a preferred embodiment of the present invention.

In accordance with a preferred embodiment of the invention, and particularly for use in the system of FIG. 2, solenoid 70 may be provided to open and close the cover members 38 of each module, preferably in response to electrical commands from controller 56 (FIG. 2).

Figure 4:
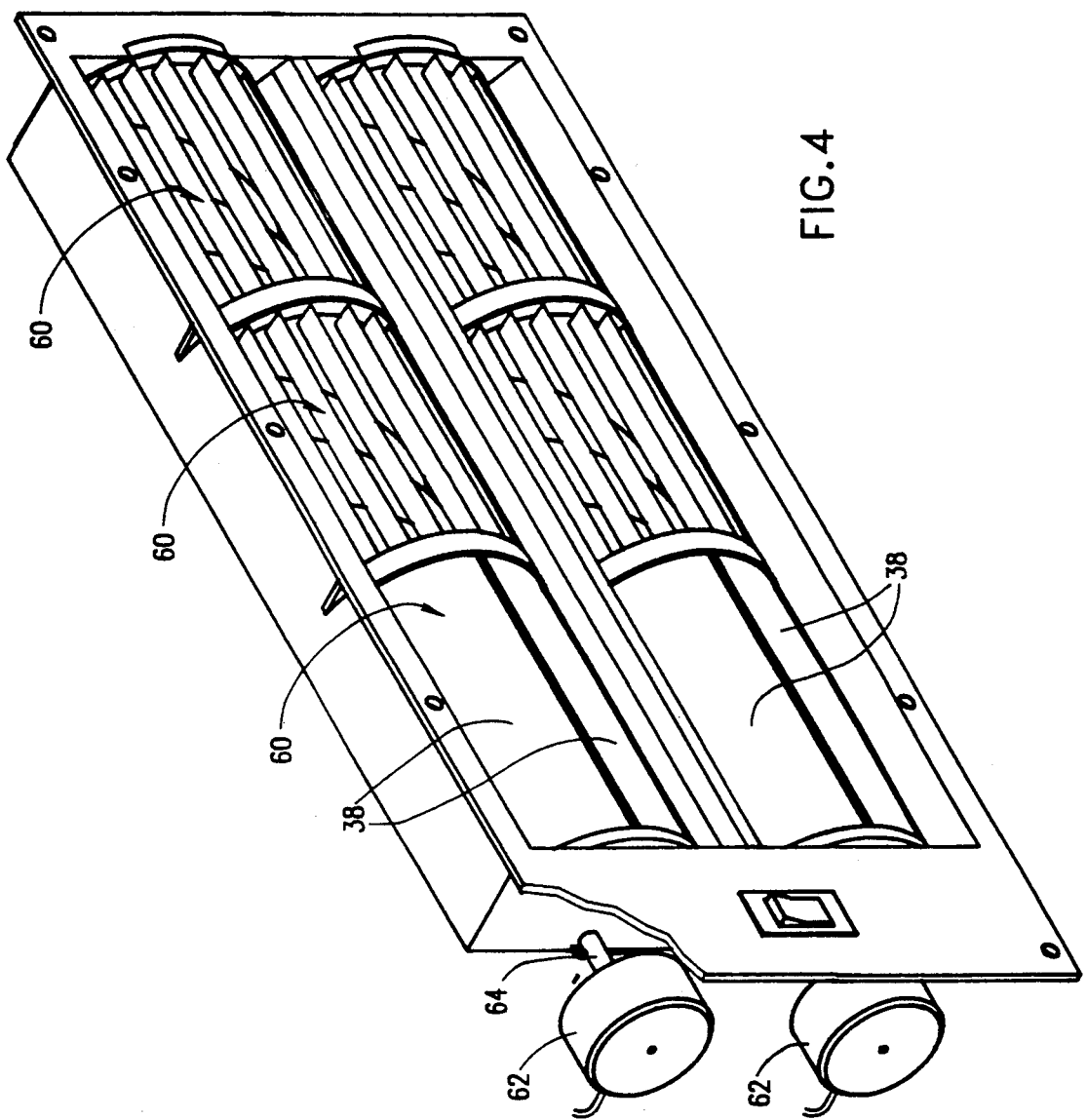
FIG. 4 is a simplified illustration of a plurality of joined and stacked grill modules arranged for common motorized operation.

Reference is now made to FIG. 4, which illustrates a pair of stacked banks of side to side joined modules, of the type described above in FIG. 3.

It will be appreciated by persons skilled in the art that the present invention is not limited by what has been particularly shown and described hereinabove. Rather the scope of the present invention is defined only by the claims which follow:

We claim:

1. An airconditioning outlet grill for installation in static structures comprising:
 a plurality of modular grill units;
 means for interconnecting the plurality of modular grill units in a desired grid arrangement, and wherein
 each of said modular grill units comprises:
 first and second arrays of vanes extending generally perpendicularly to each other, each array being directable independently of the other and being operative for selectably directing an outlet air flow without changing the volume of the air flow;
 a selectably positionable rotatable cover assembly for automatically preventing or limiting outlet air flow, said cover assembly being disposed downstream of said first and second arrays and having a fully retracted position which is outside of the outlet air flow.

2. An airconditioning outlet grill according to claim 1 and also comprising motor driven means for automatically varying the direction of air flow.

3. Apparatus according to claim 1 and also comprising remote control means for controlling the operation of the cover assembly.

4. Apparatus according to claim 3 and wherein said remote control means include means for sensing the absence of a person in a given area, for automatically preventing outlet air flow from the grill.

5. Apparatus according to claim 3 and wherein said remote control means comprises a thermostatic control.

6. Apparatus according to claim 1 and wherein operation of said cover assembly does not alter the volume or direction of outlet air flow from said grill when air flow is not prevented.

7. Apparatus according to claim 1 and also comprising means for coupling air directing vanes in each of the modular units together for common driving thereof.

8. An airconditioning outlet grill according to claim 1 and wherein said first and second arrays of vanes and said cover assembly include side wall portions having openings therein to permit air flow therethrough.

* * * * *